L. R. & L. BLEITZ.
SPEED CHANGING MECHANISM.
APPLICATION FILED AUG. 30, 1911.
1,036,531.
Patented Aug. 20, 1912.
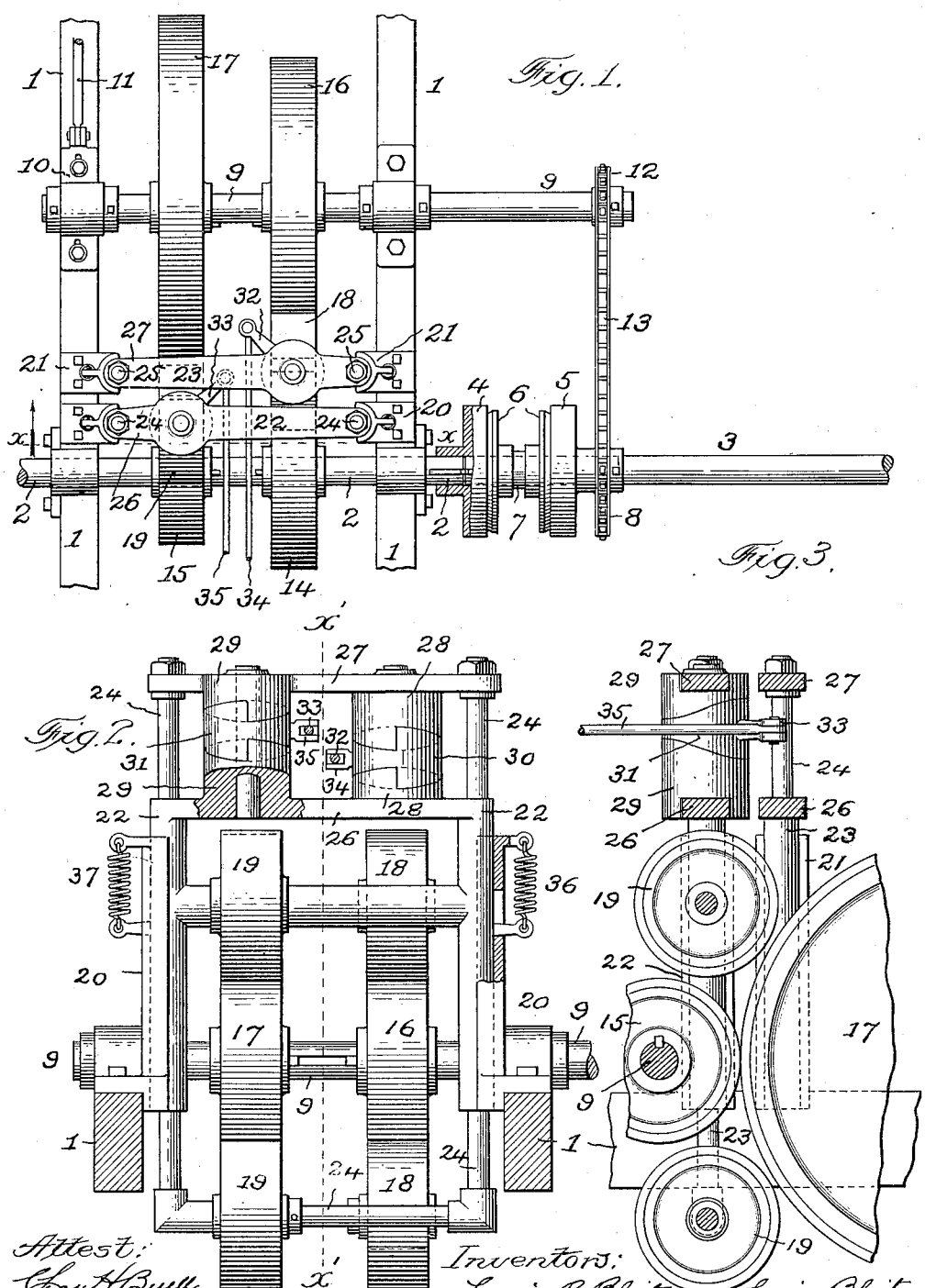

UNITED STATES PATENT OFFICE.

LOUIS R. BLEITZ AND LOUIS BLEITZ, OF LOS ANGELES, CALIFORNIA.

SPEED-CHANGING MECHANISM.

1,036,531.  Specification of Letters Patent.  Patented Aug. 20, 1912.

Application filed August 30, 1911. Serial No. 646,872.

*To all whom it may concern:*

Be it known that we, LOUIS R. BLEITZ and LOUIS BLEITZ, citizens of the United States of America, and residents of Los Angeles, in the county of Los Angeles, State of California, have invented certain new and useful Improvements in Speed-Changing Mechanisms, of which the following is a specification.

This invention relates to that class of speed changing mechanisms in which a plurality of pairs of friction wheels of varying diameters are arranged intermediate of the driving and driven shafts, and adapted for selective engagement to attain the required speed of rotation of the driven shaft. And the present improvement has for its object a simple and efficient arrangement and combination of parts, whereby a series of variable speeds, and a direct drive, as well as a reverse rotation of the driven shaft, can be obtained at will, all as will hereinafter more fully appear.

In the accompanying drawings: Figure 1, is a plan view, partly in section, of a speed changing mechanism embodying the present invention. Fig. 2, is a transverse sectional elevation on line $x$—$x$, Fig. 1. Fig. 3, is a fragmentary longitudinal section, on line $x'$—$x'$, Fig. 2.

Similar reference numerals indicate like parts in the several views.

Referring to the drawings, 1 represents the main supporting frame of any usual and suitable construction, and in or upon which is supported in longitudinal alinement the respective driving shaft 2 and driven shaft 3 of the mechanism.

4, is a clutch member of any ordinary construction keyed or otherwise, secured to one end of the driving shaft 2, and 5 is an opposed clutch member loosely mounted on an adjacent portion of the driven shaft 3. The said clutch members are in separated relation to provide space for an intermediate sliding clutch member now to be described and which is adapted to have alternate clutch engagement with the aforesaid opposed clutch members 4 and 5.

6, is the sliding clutch member above referred to, and which is slidingly connected to the driven shaft 3, by a spline or like connection which permits of a sliding movement between the parts, while preventing any independent rotation of one part with relation to the other.

7, is a peripheral groove in the middle portion of the clutch member 6, for engagement with the end of an ordinary operating lever, or other like means whereby a sliding adjustment can be imparted to the clutch member 6, by the operator, to effect the following results: First, to leave the clutch member 6 in a central position out of engagement with the two opposed clutch members 4 and 5, so that no rotation can be imparted to the driven shaft 3; second, to engage said clutch member 6, with the clutch member 4, of the driving shaft 2, to attain a direct driving engagement between said driving and driven shafts, and third, to engage said clutch member 6, with the loose clutch member 5, on the driven shaft 3, to attain a driving connection between said driven shaft and the intermediate driving mechanism hereinafter described.

8, is a sprocket wheel secured to the loose clutch member 5, so as to rotate in unison therewith, and adapted to have driven connection with the above mentioned intermediate driving mechanism by means hereinafter described.

9 is a countershaft journaled on the main frame 1, in parallel relation to the driving shaft 2, aforesaid, and having one of its journal boxes 10, connected to said frame in a sliding manner, so that movement of the countershaft 9, to and from the driving shaft 2, may be attained, for the purpose hereinafter stated.

11, is an operating rod or link connected to the box 10, for effecting an adjustment of the box 10 and the countershaft 9 journaled therein, in the operation of reversing the direction of rotation of the mechanism as hereinafter more fully set forth.

12, is a sprocket wheel secured to the countershaft 9, and connected to the sprocket wheel 8, of the loose clutch member 5, aforesaid, by an endless chain 13, to afford an operative connection between the countershaft 9 and the driven shaft 3.

14 and 15 are friction wheels or pulleys, keyed or otherwise secured to the driving shaft 2; and 16 and 17 are companion friction wheels or pulleys secured in like manner to the countershaft 9, aforesaid. Said friction wheels are of different diameters and the peripheries of each pair of said friction wheels 14, 15, 16, 17, have separated relation, normally, and driving connection between the peripheries of the respective pairs, is attained by the adjustable intermediate idler friction wheels or pulleys hereinafter described. Said separated relation is always the case with the pair of friction wheels 14, 16, farthest removed from the adjustable journal box 10, but is not always the case with the pair of friction wheels 15, 17, which are adapted by an adjustment of said box 10, by the operator, to be brought into direct frictional driving contact, as illustrated in Fig. 3, to provide a reverse rotation of the driven shaft 3, through the aforesaid chain and sprocket wheel connections 8, 12 and 13, the sliding clutch member 6, being in engagement with the clutch member 5 of said driven shaft.

18 and 19 are pairs of the intermediate idler wheels or pulleys above referred to, and each pair is individual to, and arranged above and below a plane intersecting the axes of the before described pairs of friction wheels, 14, 15, 16 and 17, on the driving shaft 2, and countershaft 9. Each pair of said intermediate idler wheels 18 and 19 are individually adjustable to and from each other by means hereinafter described, so as to be brought into frictional contact with the respective pairs of friction wheels 14, 16 and 15, 17, to frictionally transmit the motion of the driving shaft 2, to the countershaft 9, at varying speeds, depending upon the varying diameters of the aforesaid pairs of friction wheels that are brought into engagement.

20, 21, are pairs of guideways, secured in a vertical position to the main frame 1, to provide guiding engagement for the vertical side bars of the pair of yoke frames 22, 23, in which the upper intermediate idler wheels aforesaid are journaled. In the preferred construction shown in the drawings, said vertical side bars are made tubular, and provide guideways for the vertical side bars or rods of the companion yoke frames 24, 25, in which the lower intermediate idler wheels aforesaid are journaled.

The upper cross bars 26, 27, of the respective yoke frames 22, 23, 24, 25, are in adjacent and separated relation and the intervening spaces receive the hereinafter described cam mechanisms by which the pairs of intermediate idler wheels 18 and 19 carried by companion pairs of the yokes aforesaid are forcibly moved together, in the practical operation of the present speed changing mechanism.

28 and 29 are fixed counterpart pairs of spiral cam members secured to the upper cross bars 26 and 27 aforesaid, and 30, and 31 are intermediate revoluble cam members interposed between said non-revoluble cam members 28 and 29, and adapted to force said fixed cam members apart when said revoluble cam members are rotated in one direction.

32, 33, are individual arms on the respective revoluble cam members 30, 31, aforesaid and 34, 35 are operating links connected to said arms, and adapted when moved by the operator to impart the required rotation to either revoluble cam member, aforesaid and in either direction.

In the construction shown, the yoke frames 24, 25, are adapted to move downward by gravity to attain a disengagement of the lower intermediate idler wheels aforesaid from the friction wheels 14, 15, 16 and 17 before described. While the other yoke frames 22, 23, receive a yielding upward tendency by the suspension springs 36, 37, to attain a disengagement of the upper intermediate idler wheels aforesaid from the friction wheels, 14, 15, 16 and 17.

Having thus fully described our said invention what we claim as new and desire to secure by Letters Patent, is:

1. In a speed changing mechanism, the combination of a driving and driven shaft arranged in longitudinal alinement, a clutch mechanism arranged at the meeting ends of said shafts, a series of friction wheels attached to the driving shaft, a countershaft journaled in parallel relation to the driving shaft, a series of friction wheels attached to said countershaft, pairs of idler wheels individual to companion pairs of the aforesaid friction wheels of the driving shaft and countershaft, individual carriers for said idler wheels, means for imparting movement to said carriers in opposite directions, the same comprising non-revoluble cam members on the carriers and revoluble cam members engaging said non-revoluble cam members, and an operative connection between the countershaft and the driven shaft, substantially as set forth.

2. In a speed changing mechanism, the combination of a driving and driven shaft arranged in longitudinal alinement, a clutch mechanism arranged at the meeting ends of said shafts, a series of friction wheels attached to the driving shaft, a countershaft journaled in parallel relation to the driving shaft, a slidingly adjustable bearing for one end of said countershaft, a series of friction wheels attached to said countershaft, a series of intermediate idler wheels adapted to frictionally connect the wheels of the driving shaft with the wheels of the countershaft, adjustable carriers for said intermediate idler wheels, and an operative connection between the countershaft and the driven shaft, substantially as set forth.

Signed at Los Angeles, California, this 12th day of August, 1911.

LOUIS R. BLEITZ.
LOUIS BLEITZ.

Witnesses:
W. H. SHOOK,
GEORGIA NOLAN.

Copies of this patent may be obtained for five cents each, by addressing the "Commissioner of Patents, Washington, D. C."